United States Patent [19]

Newton

[11] Patent Number: 5,171,625
[45] Date of Patent: Dec. 15, 1992

[54] ALL POLYESTER FILM COMPOSITE USEFUL FOR CREDIT AND IDENTIFICATION CARDS

[75] Inventor: John R. Newton, Thornton, Pa.

[73] Assignee: ICI Americas Inc., Wilmington, Del.

[21] Appl. No.: 649,775

[22] Filed: Jan. 31, 1991

[51] Int. Cl.5 .............................................. B32B 27/36
[52] U.S. Cl. .................................... 428/195; 428/201; 428/203; 428/206; 428/207; 428/480; 428/910
[58] Field of Search ............... 428/480, 910, 195, 201, 428/206, 207, 203

[56] References Cited

U.S. PATENT DOCUMENTS

| | | | |
|---|---|---|---|
| 3,827,726 | 8/1974 | McVoy et al. | 283/7 |
| 3,897,964 | 8/1975 | Oka et al. | 283/7 |
| 4,028,475 | 6/1977 | Willdorf | 428/215 |
| 4,522,670 | 6/1985 | Caines | 156/220 |
| 4,531,765 | 7/1985 | Shulman | 283/114 |
| 4,557,963 | 12/1985 | Caines | 428/156 |
| 4,837,956 | 6/1989 | Dolence | 40/299 |
| 4,880,700 | 11/1989 | Charmot et al. | 428/337 |

Primary Examiner—Paul J. Thibodeau
Assistant Examiner—D. S. Nakarani
Attorney, Agent, or Firm—Edwin H. Baker

[57] ABSTRACT

The present invention relates to an all polyester composite film structure having: (a) an opaque, biaxially oriented polyester support core film, (b) a clear, biaxially oriented polyester top film, and (c) a first pair of dye receptive or printable receiver films that can be heat sealed together and sandwiched between the top surface of the core film and one surface of the top film wherein at least one surface of a receiver film of the first pair of receiver films is printed with a dye to form printed matter.

2 Claims, 1 Drawing Sheet

ALL POLYESTER FILM COMPOSITE USEFUL FOR CREDIT AND IDENTIFICATION CARDS

BACKGROUND OF THE INVENTION

Films or sheets of linear polyester have been commercially available for many years. The film has excellent draw orientation and has proved to be especially well suited for the biaxial film orientation process resulting in films of outstanding properties. The film is also known as polyethylene terephthalate or PET and is strong and has excellent inherent chemical and thermal stability properties. The polymer preparation and film manufacturing processes are well known to those skilled in the art and are recited in many texts, including the Encyclopedia of Polymer Science and Engineering, second edition, volume 12, by John Wiley and Sons, Inc., pages 1 through 313; and numerous U.S. and foreign patents.

The myriad uses of polyester film have resulted in the need for modification of the basic film to provide special properties such as improved heat sealability and improved printability properties.

The present invention relates to an all polyester composite film structure that has superior physical properties. More specifically, the composite film structure of the present invention is composed of multiple polyester film layers which have improved properties when printed or embossed. The composite structure is particularly useful for the manufacture of credit or identification cards.

Identification and credit cards are made of multiple sheets of several polymeric materials, such as alternative sheets of polyester and interspaced sheets of paper or polyethylene. Such cards are in wide use throughout the world, but they possess several disadvantages. Firstly, the excess polymeric materials in the card manufacturing process are costly to recycle because they are not composed of one type of polymeric material. Secondly, the raised numbers and letters on the top surface of the cards tend to not print clear copies of the number and letters after repeated use in the machines that are used to make imprints of the credit card for preparing charge receipts.

SUMMARY OF THE INVENTION

The present invention relates to an all polyester composite film structure having: (a) an opaque, biaxially oriented polyester support core film, (b) a clear, biaxially oriented polyester top film, and (c) a first pair of dye receptive or printable receiver films that can be heat sealed together and sandwiched between the top surface of the core film and one surface of the top film wherein at least one surface of a receiver film of the first pair of receiver films is printed with a dye to form printed matter. In another embodiment, the above-described all polyester film composite structure may also comprise a clear biaxially oriented polyester bottom film and a second pair of dye receptive or printable receiver films that can be heat sealed together and sandwiched between the bottom surface of the core film and one surface of the bottom film wherein at least one surface of a receiver film of the second pair of receiver films is printed with a dye to form printed matter.

A credit card or identification card can be conveniently prepared from the above-described all polyester composite film structure in a conventional shape and size (54.5 mm×86 mm) and thickness (0.32 inch or about 0.8 mm) by conventional techniques. After printing the desired surface of a dye-receptive or printable receiver film, the appropriate receiver films are heat sealed together to form the above described all polyester composite film structure.

DETAILED DESCRIPTION OF THE INVENTION

Figure 1:
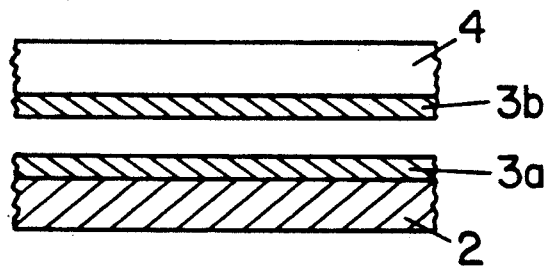

The polyester polymer useful in the manufacture of a top or bottom film of this invention is a synthetic linear polyester that is well known to those skilled in the art and is obtained by condensing one or more dicarboxylic acids or their lower alkyl (up to 6 carbon atoms) diesters, e.g. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 2-bis-p-carboxyphenoxyethane (optionally with a monocarboxylic acid, such as pivalic acid) the corresponding dicarboxylic acid diaklyl ester or lower alkyl ester with one or more glycols, e.g. ethylene glycol, 1,3-propanediol, 1,4-butanediol, neopentyl glycol and 1,4-cyclohexanedimethanol. Preferably, the polyester polymer is obtained by condensing terephthalic acid or its dimethyl ester with ethylene glycol.

The polyester film prepared from the above-described composition must be biaxially oriented. It is biaxially oriented by drawing in two mutually perpendicular directions in the plane of the film to achieve a satisfactory combination of mechanical and physical properties. Preferably, the polyester film is biaxially oriented by sequential stretching in two mutually perpendicular directions, typically at a temperature in the range of 70° to 250° C. Such stretching is described in many patents, including British Patent No. 838,708. These techniques are well known to those skilled in the polyester film manufacture art.

The opaque, biaxially oriented polyester support core film (also hereinafter called the "support film") is conveniently rendered opaque by incorporation into the above-described synthetic linear polyester polymer an effective amount of an opacifying agent. Additionally, in a further preferred embodiment of the invention the opaque support film also is voided, as hereinbefore defined. It is therefore preferred to incorporate into the polymer an effective amount of an agent which is capable of generating a voided support film. Suitable voiding agents, which also confer opacity, include an incompatible resin filler, a particulate inorganic filler or a mixture of two or more such fillers.

Preferably, the support film is white.

Opacity depends, inter alia, on the film thickness and filler content. Preferably, an opaque support film will exhibit a Transmission Optical Density (Sakura Densitometer; type PDA 65; transmission mode) of from 0.75 to 1.75 for films having a thickness of about 40 to about 340 microns, respectively, and preferably from 1.2 to 1.5 for films having a thickness of about 130 microns to about 240 microns, respectively.

An "incompatible resin" is a resin which either does not melt, or which is substantially immiscible with the polymer, at the highest temperature encountered during extrusion and fabrication of the film. Such resins include polyamides and olefin polymers, particularly a homo- or co-polymer of a mono-alpha-olefin containing up to 6 carbon atoms in its molecule. A preferred resin is polypropylene in chip form.

Particulate inorganic fillers suitable for generating the desired degree of opaqueness, in the support film include conventional inorganic pigments and fillers. Particularly useful are metal or metalloid oxides, such as alumina, silica and titanium, and the alkaline earth metal salts, such as the carbonates and sulphates of calcium and barium. Barium sulphate is a particularly preferred filler which also functions as a voiding agent.

Suitable fillers may be homogeneous and consist essentially of a single filler material or compound, such as titanium dioxide or barium sulphate alone. Alternatively, at least a proportion of the filler may be a mixture of materials or compounds, i.e., heterogeneous, the primary filler material being associated with an additional modifying component. For example, the primary filler particle may be treated with a surface modifier, such as a pigment, soap, surfactant, coupling agent or other modifier to promote or alter the degree to which the filler is compatible with the substrate polymer.

Production of a support film having satisfactory degrees of opacity, voiding requires that the filler should be finely-divided, and the average particle size thereof is desirably from 0.1 to 10 microns ($\mu$m) provided that the actual particle size of 99.9 percent (%) by number of the particles does not exceed 30 $\mu$m. Preferably, the filler has an average particle size of from 0.1 to 1.0 $\mu$m, and particularly preferably from 0.2 to 0.75 $\mu$m. Decreasing the particle size increases the gloss of the substrate.

Particle sizes may be measured by electron microscope, coulter counter or sedimentation analysis and the average particle size may be determined by plotting a cumulative distribution curve representing the percentage of particles below chosen particle sizes.

It is preferred that none of the filler particles incorporated into the support film according to this invention should have an actual particle size exceeding 30 $\mu$m. Particles exceeding such a size may be removed by sieving processes which are known in the art. However, sieving operations are not always totally successful in eliminating all particles greater than a chosen size. In practice, therefore, the size of 99.9% by number of the particles should not exceed 30 $\mu$m. Most preferably the size of 99.9% of the particles should not exceed 20 $\mu$m.

Incorporation of the opacifying/voiding agent into the support film may be effected by conventional techniques. For example, it may be incorporated by mixing with the monomeric reactants from which the support film is derived, or by dry blending it with chips or granules of the prepared polymer prior to formation of the support film.

The amount of filler, particularly of barium sulphate that is incorporated into the support film should be not less than about 5% nor more than about 50% by weight, based on the weight of the polymer. Particularly satisfactory levels of opacity are achieved when the concentration of filler is from about 8 to about 30%, and preferably from about 15 to about 20%, by weight, based on the weight of the support film polymer.

Other additives, generally in relatively small quantities, optionally may be incorporated into the support film. For example, china clay may be incorporated in amounts of up to 25% to promote voiding. Optical brighteners in amounts up to 1500 parts per million (p.p.m.) may be added to promote whiteness, and dye-stuffs in amounts of up to 10 p.p.m. may be added to modify color, with the specified concentrations being by weight, based on the weight of the polymer.

Thickness of the support film may vary depending on the envisaged application of the composite film structure but, in general, will not exceed 250 $\mu$m, and will preferably be in a range from 50 to 190 $\mu$m, particularly from 145 to 180 $\mu$m.

The support film of the kind hereinbefore described offers numerous advantages including (1) a degree of opacity (whiteness) essential to the production of prints having the intensity, contrast and feel of high quality art-work, (2) a degree of rigidity and stiffness contributing to improved resistance to surface deformation and image strike-through associated with contact with a print-head and (3) a degree of stability, both thermal and chemical, conferring dimensional stability and curl-resistance.

When printing is effected directly onto the surface of a convention synthetic linear polyester film of the kind hereinbefore described, the optical density of the developed image tends to be low and the quality of the resultant print is generally inferior.

A dye-receptive and heat sealable receiver film (hereinafter called the "receiver film") is therefore required on at least one surface of the support film, and preferably is on both surfaces of the support film, and desirably it exhibits (1) a high receptivity to dye transferred thermally from a donor sheet or from ink or dye from conventional printing sources, (2) resistance to surface deformation from contact with the print-head to ensure the production of an acceptably glossy print, (3) the ability to retain a stable image, and (4) the ability to be heat sealed to itself.

A receiver film satisfying the aforementioned criteria comprises a heat sealable and dye-receptive, synthetic thermoplastic polyester polymer. The morphology of the receiver film may be varied depending on the required characteristics. For example, the receiver film may be of an essentially amorphous nature to enhance optical density of the transferred image or essentially crystalline to reduce surface deformation, or partially amorphous/crystalline structure to provide an appropriate balance of characteristics. An essentially amorphous receiver film is preferred.

The thickness of the receiver film may vary over a wide range but generally will not exceed 50 $\mu$m. The dry thickness of the receiver film governs, inter alia, the optical density of the resultant printed image or image developed in a particular receiver film, and preferably is within a range of from about 0.5 to about 25 $\mu$m. In particular, it has been observed that by careful control of the receiver film thickness to within a range of from about 0.5 to about 10 $\mu$m, in association with an opaque, voided support film of the kind previously described herein, a surprising and significant improvement in resistance to surface deformation is achieved, without significantly detracting from the optical density of the printed or transferred image.

A polymer that is particularly useful as a receiver film, and thus offers adequate adhesion to the top, bottom and support film comprises a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory heat sealing and dye-receptivity and deformation resistance properties are those of ethylene terephthalate and ethylene isophthalate, especially in the molar ratios of from 50 to 90 mole % ethylene terephthalate and correspondingly from 50 to 10 mole % ethylene isophthalate. A preferred copolyester comprises from about 65 to about 85 mole % ethylene terephthalate and from about 35 to about 15 mole % ethylene isophthalate. An especially preferred copolyester is one of about 82 mole % ethylene terephthalate and about 18 mole % ethylene isophthalate.

Formation of a receiver film in conjunction with a top, bottom or support film may be affected by conventional techniques—for example, by casting the polymer onto a preformed top, bottom or support film. Conveniently however, formation of a composite sheet or structure (top, bottom or support and receiver film) is effected by coextrusion, either by simultaneous coextrusion of the respective film-forming layers through independent orifices of a multi-orifice die, and thereafter uniting the still molten layers. Preferably, the formation is effected by a single-channel coextrusion in which molten streams of the respective polymers are first united within a channel leading to a die manifold, and thereafter extruded together from the die orifice under conditions of streamline flow without intermixing thereby to produce a two or three layer composite sheet.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting drum to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, i.e., the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the film-forming polymer, for example—a polyester is usually stretched so that the dimension of the oriented polyester film is from about 2.5 times to about 4.5 times its original dimension in each, direction of stretching.

A stretched film may be, and preferably is, dimensionally stabilized by heat-setting under dimensional restraint at a temperature above the glass transition temperature of the film-forming polymer but below the melting temperature thereof, to induce crystallization of the polymer.

The coextruded support and receiver films, top and receiver film, and bottom and receiver film are stretched to effect molecular orientation of the support film, and preferably heat-set, as hereinbefore described. Generally, the conditions applied for stretching the support, top or bottom films will induce partial crystallization of the one or two receiver films and it is therefore preferred to heat set under dimensional restraint at a temperature selected to develop the desired morphology of the receiver film. Thus, by effecting heat-setting at a temperature below the crystalline melting temperature of the receiver film and permitting or causing the composite to cool, the receiver film will remain essentially crystalline. However, by heat-setting at a temperature greater than the crystalline melting temperature of the receiver film, the latter will be rendered essentially amorphous.

Heat-setting of a receiver film is conveniently effected at a temperature within a range of from 175° to 200° C. to yield a substantially crystalline receiver film, and from 200° to 250° C. to yield an essentially amorphous receiver film.

Optionally, a top, bottom or support film can be rendered resistant to ultra violet (UV) radiation by incorporation of a UV stabilizer. Although the stabiliser may be present in any of the layers, it is preferably present in the top and bottom layers. The stabilizer may comprise an independent additive such as benzenepropanioc acid, 3-(2H-benzotriazol-2-yl)-5-(1,1-dimethyl ethyl)-4-hydroxy-1,6-hexanediyl ester or a copolymerised residue in the chain of the receiving polymer. The polymer chain conveniently comprises a copolymerised esterification residue of an aromatic carbonyl stabiliser. Suitably, such esterification residues comprise the residue of a di(hydroxyalkoxy) coumarin—as disclosed in European Patent Publication EP-A-31202, the residue of a 2-hydroxy-di(hydroxyalkoxy) benzophenone—as disclosed in EP-A-31203, the residue of a bis(hydroxyalkoxy)xanth-9-one—as disclosed in EP-A-6686, and, particularly preferably, a residue of a hydroxy-bis(hydroxyalkoxy)-xanth-9-one—as disclosed in EP-A-76582. The alkoxy groups in the aforementioned stabilizers conveniently contain from 1 to 10 and preferably from 2 to 4 carbon atoms, for example—an ethoxy group. The content of esterification residue is conveniently from 0.01 to 30%, and preferably from 0.05 to 10%, by weight of the total receiving polymer. A particularly preferred residue is a residue of a 1-hydroxy-3, 6-bis(hydroxyalkoxy)xanth-9-one.

Optionally, an antiplasticizer can be incorporated into the receiver film. Suitable antiplasticizers comprise an aromatic ester which can be prepared by standard synthetic organic methods, for example by esterification between the appropriate acid and alcohol. The aromatic esters are relatively small molecules, with a molecular weight not exceeding 1000, and more preferably less than 500. The aromatic esters are preferably halogenated, and more preferably chlorinated, although the precise location of the halogenated species within the molecule is not considered to be crucial. The aromatic esters preferably comprise a single independent benzene or naphthalene ring. Examples of suitable non-halogenated aromatic esters include dimethyl terephthalate (DMT) and particularly 2,6 dimethyl naphthalene dicarboxylate (DMN), and suitable chlorinated aromatic esters include tetrachlorophthalic dimethyl ester (TPDE), and particularly hydroquinone dichloromethylester (HQDE) and 2,5 dichloroterephthalic dimethyl ester (DTDE).

The antiplasticiser, such as an aromatic ester, and the heat sealable and dye-receptive polymer resin components of a receiver film according to the present invention may be mixed together by any suitable conventional means. For example, the components may be blended by tumble or dry mixing or by compounding—by which is meant melt mixing e.g. on 2-roll mills, in a Banbury mixer or in an extruder, followed by cooling and, usually, comminution into granules or chips.

The ratio of antiplasticiser to polymer should generally be in the range 0.5:99.5 to 30:70% by weight, preferably from 1:99 to 20:80% by weight, and more preferably from 5:95 to 20:80% by weight.

The invention is not limited to the addition of a single antiplasticiser, and, if desired, two or more different antiplasticisers may be added to the polymer of the receiving layer, for example to optimise the observed effect.

The improvement in the optical density of the formed image, both initially and on ageing is attributed to an increase in the barrier properties of the receiver film of the present invention, and it is believed to be due to the suppression of the relaxation peak of the receiver film polymer, which occurs due to local motion of the polymer molecule. This effect is possibly due to the relatively small antiplasticiser molecules filling up the relatively fixed free volume present in the polymer below its glass transition temperature (Tg), or alternatively because the aromatic ester molecules interact more strongly with adjacent polymer chains, than do the polymer chains with each other. This effect is known as antiplasticisation. The aromatic ester molecules also act as plasticisers, lowering the Tg of the receiving layer polymer. The improvement in barrier properties occurs over the temperature range between the $\beta$ relaxation peak and the Tg of the antiplasticiser/polymer mixture.

Embodiments of this invention are illustrated by the accompanying drawing in which:

FIG. 1 illustrates a schematic sectional view of precursor films useful to prepare one embodiment of an all polyester composite film structure of this invention comprising: film 2 is an opaque, biaxially oriented polyester support film. Film 3 is a heat sealable, dye receptive receiver film. Film 4 is a clear, biaxially oriented polyester top film.

Figure 2:
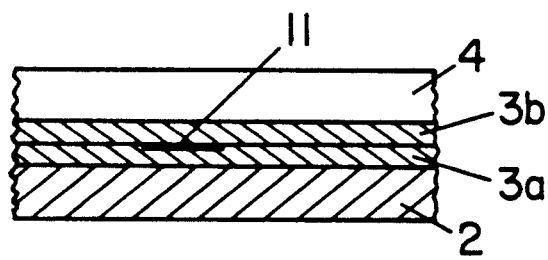

FIG. 2 illustrates a schematic sectional view of one embodiment of an all polyester composite film structure of this invention comprising: film 2 is an opaque, biaxially oriented polyester support film. Films 3a and 3b are a first pair of dye receptive receiver films, heat sealed together to form an integral structure. Film 4 is a clear, biaxially oriented polyester top film. Image 11 is a dyed portion of film 3a.

Figure 3:
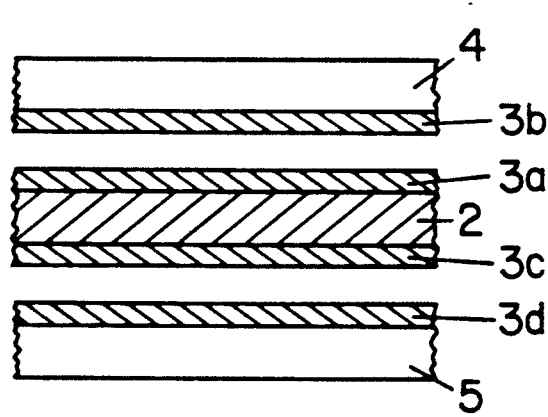

FIG. 3 illustrates a schematic sectional view of precursor films useful to prepare a second embodiment of an all polyester composite film structure of this invention comprising: film 2 is an opaque, biaxially oriented polyester support film. Films 3a through 3d are identical heat sealable, dye receptive receiver films. Film 4 is a clear, biaxially oriented polyester top film. Film 5 is a clear, biaxially oriented polyester bottom film identical to film 4.

Figure 4:
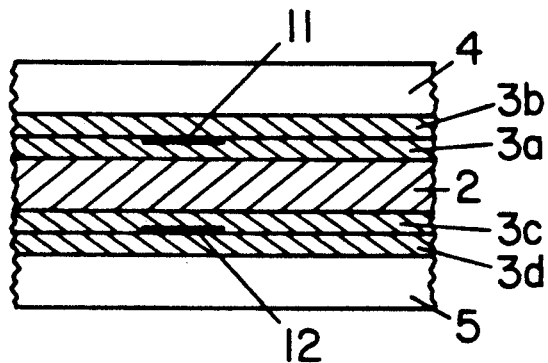

FIG. 4 illustrates a schematic sectional view of a second embodiment of an all polyester composite film structure of this invention comprising: film 2 is an opaque, biaxially oriented polyester support film. Films 3a and 3b are a first pair of dye receptive receiver films, heat sealed together to form an integral structure. Film 4 is a clear, biaxially oriented polyester top film. Image 11 is a dyed portion of film 3a. Films 3c and 3d are a second pair of dye receptive receiver films, heat sealed together to form an integral structure. Film 5 is a clear, biaxially oriented polyester bottom film. Image 12 is a dyed portion of film 3c.

Referring to the drawing, the chemical composition of opaque, biaxially oriented polyester support film 2 and the chemical composition of heat sealable, dye receptive receiver films 3a and/or 3b have been discussed previously. The formation of receiver films 3a and 3c on core film 2 can be accomplished by conventional techniques such as by coextrusion through a single or multi-orificed die as discussed above.

The chemical composition of the clear, biaxially oriented top and bottom films, along with the chemical composition of receiver films 3b and 3d are discussed above.

The formation of receiver film 3b on top film 4 and receiver film 3d on bottom film 5 are accomplished by conventional techniques such as by coextrusion through a single or multi-orificed die as discussed above.

Heat sealable, dye receptive receiver films 3a and 3c can be printed with desired shapes such as numbers, letter, images or designs by any of the conventional printing techniques such as off-set, gravure, silk screen or flexographic printing. Also, receiver films 3a and 3c can be printed by a process called thermal transfer printing (TTP) as described in U.S. Pat. Nos. 4,839,338, 4,897,377 and 4,912,085 which are incorporated herein by reference.

Generally, the TTP process is effected by first assembling a donor sheet composed of a polymeric substrate sheet having on the front surface a transfer layer of a subliminal dye in a resin binder and on the other rear surface a polymeric protective surface.

In a typical TTP process, the transfer layer of the donor sheet (described above) is contacted with a release layer which is contacted with a receiver sheet for transfer of an image. An electrically activated thermal print head having a plurality of print elements is placed in contact with the aforementioned protective layer of the donor sheet. Energisation of the print head causes selected individual print elements to become hot, thereby causing dye from the underlying region of the transfer layer to sublime through the dye-permeable release layer into a portion of receiver films 3a through 3d where it forms images 11 and 12 of the heated element. After the desired printing, the donor sheet is separated from receiver films 3a through 3d.

By advancing the donor sheet relative to a receiver film 3a through 3d and repeating the process, a multicolour image of the desired form may be generated in the receiving layer.

Heat sealable, dye receptive receiver films 3a and 3b as well as 3c and 3d can be heat sealed together to form an integral structure by conventional techniques well known to those skilled in the art.

The invention is further illustrated by reference to the following examples:

EXAMPLE I

A support film was prepared by having each surface bonded to a receiver film. Separate streams of (1) a first polymer comprising polyethylene terephthalate containing 18% by weight, based on the weight of the polymer, of a finely-divided particulte barium sulphate filler having an average particle size of 0.5 $\mu$m, and (2) a second polymer comprising an unfilled copolyester of 82 mole % ethylene terephthalate and 18 mole % ethylene isophtalate were supplied from separate extruders to a conventional single-channel coextrusion assembly. The polymers were extruded through a film-forming die onto a water-cooled rotating, quenching drum to yield an amorphous film composite extrudate. The film extrudate was heated to a temperature of about 80° C. and then stretched longitudinally at a forward draw ratio of 3.2:1.

The coated, longitudinally stretched film composite was then heated to a temperature of about 96° C. and stretched transversely in a stenter oven at a draw ratio of 3.4:1. The stretched film was finally heat-set under dimensional restraint in a stenter oven at a temperature of about 225° C.

The resulting film composite comprised a biaxially oriented opaque, voided support film of filled polyethylene terephthalate of about 150 μm thickness having on both surfaces thereof a dye receptive (or printable) heat sealable receiver film of the isophthalate-terephthalate copolymer of about 4 μm thickness. By virtue of the heat-setting temperature employed, the receiver film was of an essentially amorphous nature.

EXAMPLE II

A top/bottom film was prepared having one surface bonded to a receiver film. Separate streams of (1) a first polymer of polyethylene terephthalate and (2) a second polymer comprising an unfilled copolyester of 82 mole % ethylene terephthalate and 18 mole % ethylene isophthalate were supplied from separate extruders to a conventional single-channel coextrusion assembly, and extruded through a film-forming die onto a water-cooled rotating, quenching drum to yield an amorphous film composite extrudate. The film extrudate was heated to a temperature of about 80° C. and then stretched longitudinally at a forward draw ratio of 3.2:1.

The second coated, longitudinally stretched film composite was then heated to a temperature of about 96° C. and stretched transversely in a stenter oven at a draw ratio of 3.4:1. The stretched film was finally heat-set under dimensional restraint in a stenter oven at a temperature of about 225° C.

The resulting second film composite comprised a biaxially oriented top/bottom film of polyethylene terephthalate of about 150 μm thickness having on one surface thereof a dye receptive (or printable) heat sealable receiver film of the isophthalate-terephthalate copolymer of about 4 μm thickness. By virtue of the heat-setting temperature employed, the receiver film was of an essentially amorphous nature.

EXAMPLE III

The first film composite of Example I was printed with letters and numbers using a printing machine.

Thereafter, the receiver film layer of the top film was superimposed onto a receiver film of the support film. Simultaneously, the receiver film layer of the bottom film was superimposed onto the second receiver film of the support film in a sheeting machine. The combined film layers were heated to a temperature of 250° C. and subjected to a pressure of 10 pounds per square inch pressure (p.s.i.) to form a composite film structure as shown in FIG. 4 of the drawing.

EXAMPLE IV

Credit card sized blanks were cut from the composite film structure of Example III.

We claim:

1. An all polyester composite film structure consisting essentially of:
   (a) an opaque, biaxially oriented polyester support film;
   (b) a clear, biaxially oriented polyester top film;
   (c) a pair of dye receptive and heat sealable thermoplastic polyester polymer receiver films that are heat sealed together and sandwiched between the top surface of the support film and one surface of the top film wherein at least one surface of a receiver film of the first pair of receiver films is printed with a dye to form printed matter such that the printed matter is between the two receiver films.

2. An all polyester film composite structure consisting essentially of:
   (a) an opaque, biaxially oriented polyester support film;
   (b) a clear, biaxially oriented polyester top film;
   (c) a first pair of dye receptive and heat sealable thermoplastic polyester polymer receiver films heat sealed together and sandwiched between the top surface of the support film and one surface of the top film wherein at least one receiver film of the first pair of receiver films is printed with a dye to form printed matter such that the printed matter is between the two receiver films;
   (d) a clear, biaxially oriented polyester bottom film;
   (e) a second pair of dye receptive and heat sealable thermoplastic polyester polymer receiver films that are heat sealed together and sandwiched between the bottom surface of the support film and one surface of the bottom film wherein at least one receiver film of the second pair of receiver films is printed with a dye to form printed matter such that the printed matter is between the two receiver films.

* * * * *